H. SCHURING.
SAW GUIDE.
APPLICATION FILED APR. 11, 1911.
996,149.
Patented June 27, 1911.
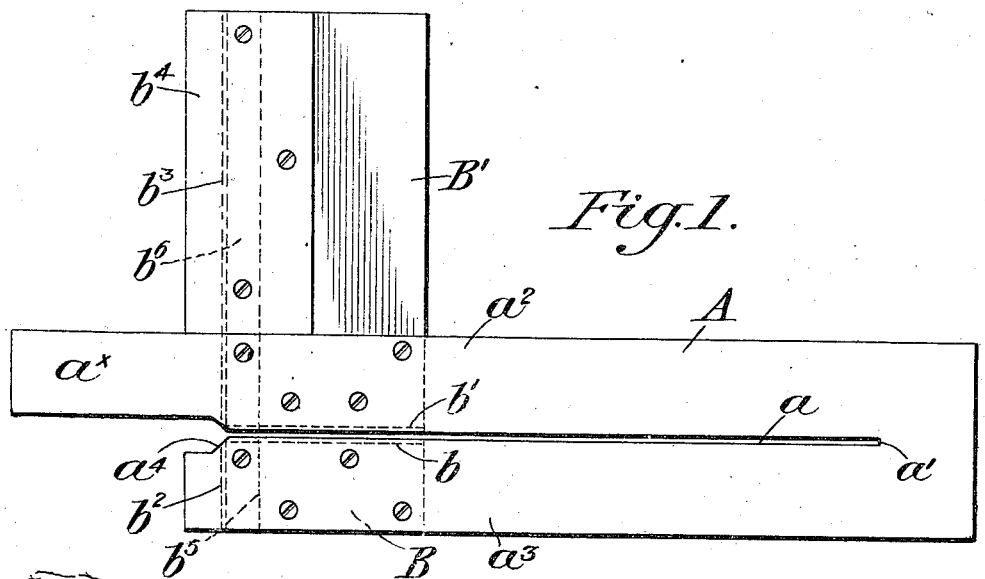
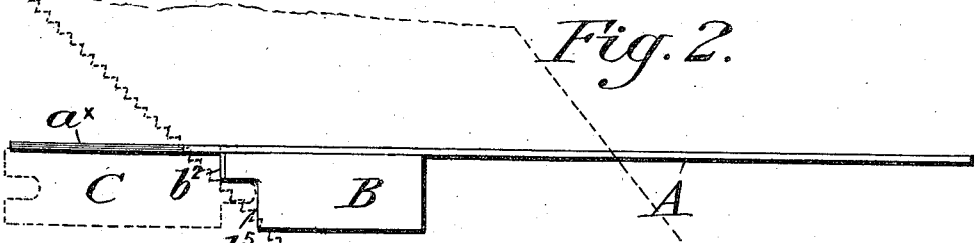
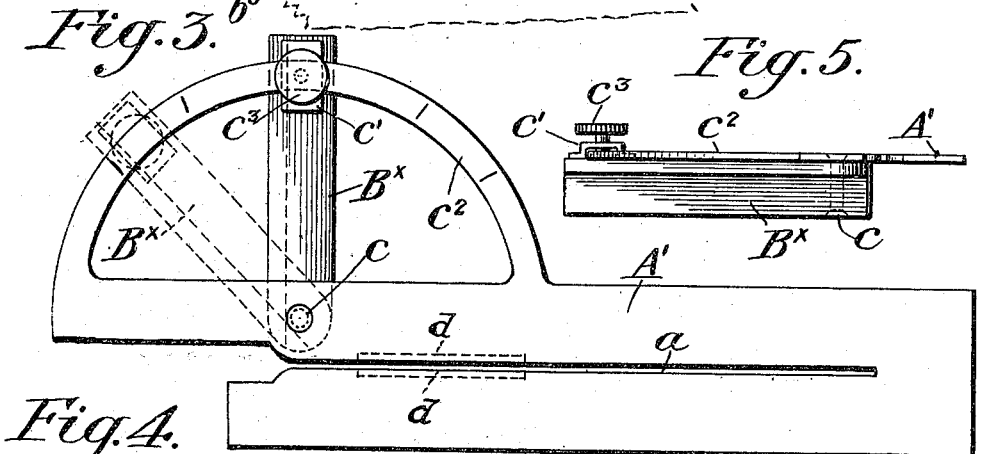

UNITED STATES PATENT OFFICE.

HARM SCHURING, OF CHERRYDALE, VIRGINIA, ASSIGNOR OF ONE-HALF TO JAMES O'DONNELL, OF WASHINGTON, DISTRICT OF COLUMBIA.

SAW-GUIDE.

996,149.   Specification of Letters Patent.   Patented June 27, 1911.

Application filed April 11, 1911. Serial No. 620,438.

*To all whom it may concern:*

Be it known that I, HARM SCHURING, a citizen of the United States, residing at Cherrydale, county of Alexandria, State of Virginia, have invented certain new and useful Improvements in Saw-Guides; and I do hereby declare the following to be a full, clear, and exact description of the invention, such as will enable others skilled in the art to which it appertains to make and use the same.

The present invention relates to an improved saw guide, primarily intended for the use of carpenters, which not only guides the saw in an especially effective fashion and causes it to form a straight kerf, but also provides for the direction of the kerf at exactly right angles to a straight edge of the board or strip to be sawed, and in some cases in other desired directions with respect to such an edge.

The device is of simple form, and in addition to the functions above described it may be used as an ordinary carpenter's square.

In the accompanying drawing, Figure 1 is a top plan view of a saw guide embodying the invention, Fig. 2 is a side elevation of the device showing the same as used for cross sawing tongue and grooved strips, Fig. 3 is a top plan view of a somewhat modified form of the device, and Figs. 4 and 5 are edge views of the device shown in Fig. 3.

Referring to the drawings, and particularly to Figs. 1 and 2, A is an elongated plate, preferably of metal, having a longitudinal median kerf or slit $a$ which extends nearly to one end of said plate, as indicated at $a'$. The kerf or slit $a$ divides the plate A into two branches $a^2$, $a^3$, of which the branch $a^2$ is preferably made the longer, as shown in Fig. 1. The slit $a$ divides the branches $a^2$, $a^3$, throughout the length of the plate with the exception of the connecting end portion shown at the right of Fig. 1, and said slit serves to guide the saw in the manner to be hereinafter explained. The outer end of the slit is widened slightly, as shown at $a^4$, so as not to injure the saw teeth at that point.

Applied to the under surfaces of the branches $a^2$, $a^3$ are blocks B, B′ preferably of wood, the adjacent edges of which are preferably lined with metal, as at $b$, $b'$, the metal lining portions being approximately flush with the respective edges of the guide slit $a$. The block B is relatively small, being of the same width approximately as the branch $a^3$, to which it is suitably applied adjacent the mouth $a^4$ of the guide slit. The block B′ extends perpendicularly to the plate A and the guide slit for a considerable distance beyond said plate, it being alined with the block B, and both of said blocks having straight edges $b^2$, $b^3$ which are alined with each other perpendicularly to the guide slit. The straight edges $b^2$, $b^3$ are preferably formed of metal plates and the block B′ is preferably covered in part by a metal plate $b^4$ overlying the edge $b^3$ and suitably secured to said block, as shown. Beneath the straight edges $b^2$, $b^3$ the blocks B, B′ may be undercut to present rabbets $b^5$, $b^6$.

In using the device for cross sawing tongue and groove strips, the saw is introduced into the guide slit $a$ as shown in Fig. 2 and the blocks B, B′, which in conjunction form a straight-edge member, are placed against the straight edge of the strip C to be sawed. In the embodiment shown the tongue of the strip is received by the rabbets $b^5$, $b^6$. The block B′ is embraced by the left hand of the workman, whose palm rests on the metal plate $b^4$, and the device can thus be readily gripped and held in position during the sawing operation which then takes place. It will be understood that the saw will be effectively guided by the guide slit and that the work will be divided perpendicularly to an edge of the same without the necessity of marking it preliminarily, as is ordinarily essential. The extension $a^x$ on the plate portion $a^2$ assists in seating the device on the work and also gives the workman a good grip. It will be readily understood, moreover, that the device may be used as a square as well as a saw guide. If desired, the rabbets $b^5$, $b^6$ may be omitted even when the device is intended for use on tongue and grooved work, although said rabbets are of considerable value in positioning the device on work of this character, as will be apparent.

In the form of the device shown in Figs. 3 to 5, the cut of the saw may be effected at any desired angle to the work, as in mitering. In this case, the plate and block elements are not fixed with respect to each other but are capable of angular adjustment. In the views just mentioned, A′ is the guide plate having the usual guide slit $a$, and $B^4$ is a block pivoted by means of a screw $c$ to the plate $A'$, adjacent the mouth of the guide slit. Thus the block $B^x$ is capable of laterally swinging movement with respect to the guide plate, and it is guided in this movement by means of a keeper $c'$ at its outer end which extends over a graduated arcuate guide member $c^2$ that is preferably formed integral at its ends with the guide plate, as shown. The keeper $c'$ has a set screw $c^3$ associated therewith by means of which the block $B^x$ may be clamped in the position to which it has been adjusted. In order to set the block at any desired angle, the screw $c^3$ is first loosened, whereupon the block is swung so that its straight edge will register with the proper graduation of the scale on the guide arm. The screw is then tightened to fix the block in position and the device can then be used in substantially the same manner previously described. This form of the device may also be used as a square when the swinging block is properly set, as will be understood. In order to assist the positioning of the device on a strip or plank which is to be sawed at an angle, I find it expedient to apply positioning blocks $d$ to the under surface of the guide plate at opposite sides of the guide slit, these blocks being located at some distance from the entrance of said slit, as shown.

Without limiting myself to the construction shown, I claim:—

1. A saw guide comprising a flat guide plate having a longitudinal guide slit, and a straight-edge member directed laterally from said plate.

2. A saw guide comprising a flat guide plate having a longitudinal median slit dividing the same into two branches, and a guide block extending laterally from one of said branches.

3. A saw guide comprising a flat plate having a longitudinal guide slit dividing the same into two branches, and a straight edged block extending sidewise from one of said branches near the mouth of the guide slit, and applied to the under surface of said branch.

4. A saw guide comprising a flat guide plate having a longitudinal guide slit extending nearly to one end of the same and having an open mouth at the opposite end of the plate, said slit dividing the plate into opposite branches, one of which extends beyond the other at the end adjacent the mouth of the slit, and a straight edged member extending laterally from the longer branch of the plate, adjacent the mouth or entrance of the guide slit, as described.

5. A saw guide comprising a flat plate having a longitudinal guide slit with an open mouth or entrance at one end of the plate, and a straight edged member extending in a plane parallel to the plate and directed laterally therefrom, the straight edge of said member being adjacent the mouth of the guide slit, and the opposite end of the guide slit extending beyond said straight edge member to receive the back portion of the saw.

6. A saw guide comprising a flat plate having a longitudinal guide slit with an open mouth at one end, a block pivoted to said plate adjacent said mouth, to swing laterally with respect to said plate, means to guide said block in its swinging movement, and means to clamp the same in adjusted position.

In testimony whereof I affix my signature, in presence of two witnesses.

HARM SCHURING.

Witnesses:
ARTHUR L. BRYANT,
CHAS. J. O'NIELL.

---

Copies of this patent may be obtained for five cents each, by addressing the "Commissioner of Patents, Washington, D. C."